United States Patent Office.

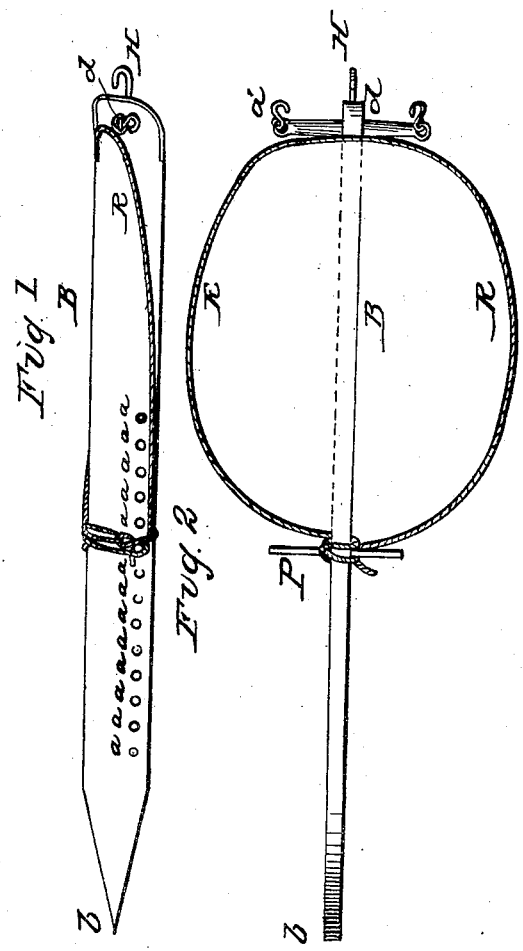

CHARLES T. GRIMES, OF LANCASTER, KENTUCKY.

Letters Patent No. 101,122, dated March 22, 1870.

IMPROVEMENT IN HORSE HAY-FORKS.

The Schedule referred to in these Letters Patent and making part of the same

I, CHARLES T. GRIMES, of the town of Lancaster, in the county of Garrard and State of Kentucky, have invented a new and useful Implement for use in Hauling Stacks or Shocks of Hay, Corn, Corn-Fodder, Broom-Corn, and other like substances from the field to the barn, or other receptacle provided for the same.

The nature and object of my invention consist in the construction of a long blade of wood or metal, of such form that it may be easily forced through a stack of hay or other like substance, and providing such blade with pin-holes and a pin, and a rope and a hook, so that a team of animals may be easily hitched to and haul such shock from the field to any place desired, without the labor of taking such stack to pieces, by dragging it over the ground in the same position in which it stands in the field.

In the accompanying drawings—

Figure 1 represents a side view of such blade, and

Figure 2, a top view of the same.

It should have a length of, say, ten feet, a width of, say, six inches, and a thickness of, say, two inches. If made of metal, then the thickness may be less in a corresponding degree, and the blade should taper gradually from the draft end to the point, at the other end, like a broadsword, so as to facilitate the running it through the stack.

I claim nothing for the material and dimensions of this blade, but only for its proportions. It should be made with a series of holes, $a\ a\ a\ a\ a$, say two inches in diameter, and this series should run parallel to and near the lower edge of the blade, as shown in fig. 2.

About two inches from the draft end and about one inch from the upper edge of the blade, as at $d$, is inserted a single-tree, $a'$, to which the team is to be attached.

A hook, H, as shown in the drawing, may be driven into the draft end of the blade, by which a double-tree or other means of attachment may be applied when more animals than one may be deemed necessary.

To fit the holes before described, a wooden pin is provided of, say, three feet in length, and then a rope of suitable length and diameter is provided, as shown in the drawings.

The operation of this apparatus is simple enough.

The blade B is run through the center of the stack or shock two or three feet above the ground (reference being had, of course, to the diameter and height of the same) up to the single-tree $a'\ a'$.

The pin P is then inserted in one of the holes in the blade on the opposite side of the stack to the single-tree, so as to embrace the stack as tightly as practicable between the pin and the single-tree.

One end of the rope R is made fast by a running noose or otherwise to the blade, near where the pin may be inserted, and then the other end is passed around the stack and just over the top edge of the blade, where the single-tree is inserted, and is then drawn tightly and tied or otherwise fastened to the blade, close up to the pin.

The team is then hitched to the blade in the manner before indicated, and the shock or stack in nearly an upright position is drawn from the field.

It will be obvious from the construction and the manner of using this apparatus that the stack or shock will not be apt to fall down in any direction, and by its simplicity and efficiency it will save much time and labor by its use.

What I claim to be new, and desire to secure by Letters Patent, is—

The blade B, with its series of holes $a$, and the hook H, in combination with the rope R and pin P, when constructed and arranged substantially as and for the purpose described.

CHARLES T. GRIMES.

Witnesses:
 LEWIS U. PHILIPS,
 ALLAN A. BURTON.